Patented Dec. 12, 1950

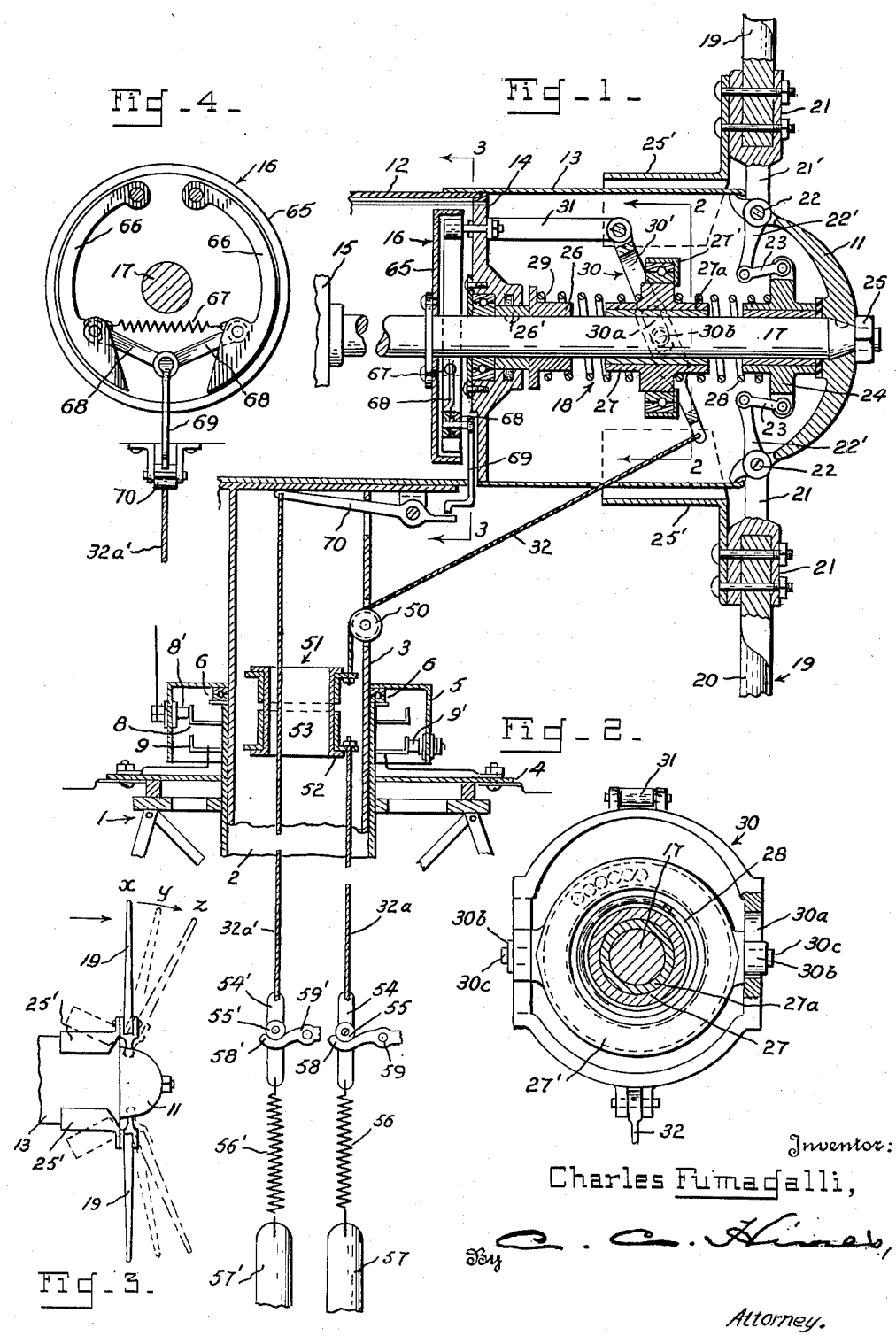

2,533,785

UNITED STATES PATENT OFFICE 2,533,785

VARIABLE PROPELLER

Charles Fumagalli, Guatemala, Guatemala

Application November 15, 1946, Serial No. 710,026

13 Claims. (Cl. 170—74)

This invention relates to improvements in windmills for driving an electric generator or other power supplying device, and particularly to windwheel propeller constructions.

One object of the invention is to provide a windmill which is adapted to be manufactured and sold at a comparatively low cost, which is reliable and efficient in action, which embodies a comparatively small number of parts of a type not liable to easily get out of working order, and which requires little attention and is automatically controlled at all times to prevent damage to the working parts thereof or to the power supplying device driven thereby.

Another object of the invention is to provide a windmill propeller which is operative to automatically vary its effective diameter and working speed and power under varying wind pressures and which is governed by controlling means operating in conjunction with the wind pressure to regulate its speed so as to secure safe running of and prevent damage to the windmill and generator or other power supplying device driven thereby in the presence of stormy wind speeds or gales.

A still further object of the invention is to provide a propeller which may be employed to drive a generator for charging a battery adjustable to vary its speed together with associated control means controlled by and controlling the propeller to adapt the propeller to operate at a determined high speed regardless of wind pressures for rapidly charging the battery and until the battery reaches a predetermined high rate of charge, and which control means may then be regulated or set to reduce the speed of the propeller and the charging rate to fully charge the battery without liability of injury thereto.

Still another object of the invention is to provide a windmill having an adjustable propeller of the character described, operating in conjunction with centrifugal means, a mechanical controlling and transmission device, and the action of the wind, to vary its effective area or diameter to maintain a constant speed under different wind pressures when a high generating rate is required and to reduce its speed when a low generating rate is required.

A still further object of the invention is to provide novel means for shifting the propeller from high speed to slow speed and then governing it to operate safely at low speed regardless of wind speeds and pressures.

A still further object of the invention is to provide a construction which simplifies while increasing the efficiency of the windmill.

With these and other objects in view, which will appear in the course of the subjoined description, the invention consists of certain novel features of construction, combination and arrangement of parts, hereinafter more fully set forth and claimed, and as shown in the accompanying drawings, in which:

Fig. 1 is a vertical longitudinal section through the windmill head and upper portion of the tower of a windmill embodying my novel construction of propeller.

Fig. 2 is a transverse section taken on line 2—2 of Figure 1 through the drive shaft and intermediate sleeve of the mechanical controller, showing the sleeve housing and the yoke-lever in elevation.

Fig. 3 is a diagrammatic view exemplicatively showing positions of the propeller.

Figure 4 is a sectional view taken on line 3—3 of Figure 1 looking toward and showing particularly the construction of the brake device.

Referring now more particularly to the drawing, 1 designates the upper part of a windmill frame or tower carrying an outer stationary shaft 2 and an inner shaft 3 rotatable therein, said shafts having fixed thereto turntable members 4 and 5 between which are interposed antifriction bearings 6, and on which shaft 3 the windmill head 7 is mounted so as to be rotatably movable to maintain itself normally in the path of the wind. As shown, the upper turntable member 5 is preferably formed to provide a housing enclosing collector rings 8 and 9 and associated brushes 8' and 9' forming part of a current supply system including a battery to be charged by a generator when the windmill is used to drive a generator, as hereinafter described.

The windmill is of the tail vaneless type and its head 7 is in the form of a streamlined body or casing including a partly spherical or concavo-convex rotary rear end portion 11 forming the hub of the propeller, and front and rear casing sections 12 and 13, the front section 12 being in practice closed at its forward end by a cowl or cap piece (not shown), and the rear end of the casing being closed by the member 11 which has its concaved side facing the casing section 13 and forming a chamber in open communication therewith. The section 12, which is separated from the section 13 by a stationary bearing head or partition 14, forms an enclosure for the generator 15 or other power supplying device to be driven, and a brake device 16, while the section 13 forms an enclosure for the rear portion of the generator drive shaft 17 and the parts of a mechanical transmission and controller generally indicated at 18, governed by and governing the action of the adjustable propeller, whereby the speed of the propeller and charging rate of the generator are regulated.

The adjustable or variable windmill propeller comprises the hub 11 and a pair of diametrically disposed blades 19 projecting radially thereof and suitably contoured and having surfaces 20 facing forwardly for the action of the wind thereon to rotate the propeller even under the forces of very low wind pressures. The blades are fastened at their inner ends to the outer ends of bracket members 21 having staffs or arms 21' pivoted at 22 to the hub 11 and provided with crank extensions 22' projecting into the hub toward the shaft and coupled by links 23 to a controlling sleeve 24 slidably mounted on the shaft 17 and which forms part of the control mechanism 18. The shaft 17, as shown, extends rearwardly from the generator through and is journaled in the head 14 and extends outward at its rear end through the hub. This end of the shaft 17 is splined to the hub 11 and threaded to receive a nut 25, by which it is fixed to rotate with the hub but is detachably connected therewith. Rotation of the propeller, therefore, effects rotation of the generator drive shaft 17 and armature in an obvious manner. The crank arms 22' and links 23 provide pivotal motion transmitting connections between the blades and sleeve 24 for sliding the sleeve inwardly or forwardly under the thrust of the blades when folding under increasing wind forces and for transmitting reverse motion from the sleeve to the blades to move the blades back toward their normal radial positions on relative reductions of the wind forces.

Normally the blades 19 of the propeller project outward at right angles from the head 13 with their surfaces 20 facing forwardly in the direction from which the wind is coming, as shown in Fig. 1 and in full lines in Figure 3, and the propeller blades act as tail vanes to rotate the head 13 on the turntable 4—5, as the wind changes direction, to keep the head 13 in the path of the wind. From the position shown in Figure 1 and in full lines in Figure 3 the blades are movable rearwardly on their transverse pivots 22 to different rearward degrees or angles of inclination for feathering actions under varying and increasing wind forces to variable speed and power positions. As the blades move rearwardly to different degrees the diameter of the propeller progressively decreases as well as its effective area of surface exposed to the direct action of the wind and the angular position changes of the blades allows the wind to slip off the acting surfaces of the blades for a washout action, through which movements, and against counter-centrifugal and pressure-resistances, provided as hereinafter described in accordance with the present invention, the propeller will be adjusted to secure its safe operation against high wind forces and to drive the generator at required and desired speeds regardless of wind forces. It is to be understood that the extent of backward movement or feathering action of the propeller blades to different angles of incidence is such that within a given proportion of their full range of backward movement the adjustment of the blades adapts them to be driven for a fast current supplying and battery charging action at a substantially constant safe high speed regardless of the force of the wind, due to proportionate changes in angularity giving the same general speed at different wind velocities, while during the remainder of their backward shifting range the diameter and area of the blades exposed to the wind will be reduced to the minimum intended to adapt the propeller and generator to be driven at a lower speed for a reduced current supplying and battery charging action.

The means for establishing an opposing centrifugal resistance to the backward motion of the propeller blades under centrifugal force engendered by the rotation of the blades comprises counterweights 25' attached to the inner ends of the blades or their brackets and which are preferably of arcuately curved form to conform to the curvature of and straddle the casing 13 when the blades are in normal position. These counterweights may be of a size and weight proportioned to the size and weight of the blades to set up any desired or required resistance to the rearward movement of the blades and to cooperate with the mechanical pressure-resistance transmission and control device 18, so that the sensitiveness of the blades to changes in their angular position and that of the controlling means to the automatic adjustment of the propeller blades may be regulated to suit operating conditions.

The mechanical pressure-resistance controller and transmission 18 comprises the outer or rear sliding sleeve 24, an inner or front sleeve 26 fixed to the shaft 17 and spaced from the head 14 by a spacing and packing gland or sleeve 26', an intermediate sleeve 27 and bushing 27a slidable on and rotatable with the shaft 17 and in a bearing housing 27', a primary control spring 28 disposed between the sleeves 24 and 27, a secondary control spring 29 disposed between the sleeves 26 and 27, a control yoke-lever 30 having the upper ends of its arms 30' pivoted to a bracket 31 and formed in said arms with slots 30a receiving rollers 30b on knuckle arms or spindles 30c projecting from housing 27', whereby the lever is pivoted to the housing 27', and a cable 32 attached to the joined lower ends of the arms of the lever and controlled by and controlling the movements of the sleeve 27 as hereinafter described.

The cable 32 from the lever 30 leads downward over a guide pulley 50 to the upper rotatable part 51 of a coupling sleeve supporting with the non-rotatable lower half 52 of said sleeve a guide tube 53, the said sleeve parts and tube being suitably flanged to hold them assembled and to permit of their up and down or floating movement and to permit independent rotation of sleeve part 51 with the head 7. A cable 32a forming a continuation of cable 32 extends downwardly therefrom and carries an elongated loop shaped connecting member 54 provided with a roller 55 and having depending therefrom a compensating spring 56 from which is hung a weight 57. The lower end portion and roller 55 of the member 54 are respectively adapted to receive and seat in the hooked end 58 of a suitable holding device or latch member 59 whereby the lever 30 may be held in position to set the controller 18 for a high speed propeller action.

The brake device 16 may be of ordinary type and as shown comprises a drum 65 fixed to the shaft 17, a pair of pivoted brake shoes 66 to engage the drum, a spring 67 to hold the shoes normally retracted, links 68 connecting the free ends of the brake shoes, and a rod 69 coupled to the links for actuating the shoes. Rod 69 is adapted to be operated by a lever 70 from which depends a cable 32a' carrying a connector 54' similar to connector 54 and provided with a roller 55' to engage the hook end 58' of a holding device or latch member similar to latch member 59, from which connector 54' depends a compensating spring 56' and weight 57' similar to the spring 56 and weight 57 attached to connector.

Before setting forth the controlling actions of the controller 18, it is believed to be desirable to describe the working action of the propeller and the arrangement of the parts when the apparatus is at rest, and the manner in which the apparatus is thrown into action and the controller rendered operative to govern the operation of the apparatus and to throw it out of operation when the battery is fully charged.

It is to be understood that the apparatus is manually thrown into operation by engaging the connectors 54, 54' with the holders 59, 59' and is adapted to be thrown out of action by the disengagement of the connectors 54, 54' from the holders 59, 59'. It is also to be understood that in the working operation of the apparatus controller 18 when released by disengagement of connector 54 from holder 59 allows the propeller to shift from high speed fast charging to slow speed or slow charging position. Fig. 1 shows the apparatus as it appears, for example, after connectors 54, 54' are applied to holders 59, 59' to release the brake and hold it released and to adjust the parts of the controller 18 to normal positions and dispose the blades of the propeller in normal position to start the windmill for high speed running.

With regard to the propeller, it is to be understood that the blades thereof, when in the normal running position shown, extend at right angles to the windmill head with their surfaces 20 arranged broadside to and facing the wind, from which position the blades are moveable rearwardly at rearward angles of different degrees governed by the controller, to vary their speed and the working diameter of the propeller at certain medium wind pressures at medium propeller speeds and vary the power applied to the generator from high to low generation rate as required by the condition or state of charge of the battery.

When the propeller is in normal running position the blades and their counterbalancing weights balance each other and the sleeve 27 of controller 18 is in an intermediate position between the sleeves 24 and 26 with the springs 28 and 29 in a calibrated state of compression and balancing each other and mutually opposing backward movement of the propeller blades. Sleeve 27 is held in such position by the cable 32 and latch 59 until it is released for action of weight 57 to move sleeve 27 to the left for a mechanical controlling action allowing an earlier and easier backward movement of the propeller blades for shifting them while running from fast generating to slow generating position.

Assuming that the apparatus as shown in Figure 1 has just been set into action to operate the generator to charge a battery, for example, and that the battery at this time is in a low state of charge, it will be understood that the propeller blades will operate in normal position until the propeller is operating at high propeller speed and the generator is operating at high charging rate speed, and that thereafter the propeller blades will be governed as to position by the wind pressures and the action of the counterweights 25' and controller 18.

Initially the propeller drives the generator at about ¾ of its charging rate, the propeller delivering enough power to drive the generator, but not sufficient speed to operate the generator at its maximum charging rate, the propeller running like a flat disk, i. e., with its blades turning in a plane perpendicular to the plane of the head, until it reaches a rotational speed of, say 800 R. P. M. at a wind speed of about 16 to 18 M. P. H., the generator delivering, for example, about 30 amperes.

The speed and pressure of the wind force the propeller blades rearwardly to a funnelwise folding position to a certain degree of angularity of the blades. For example, as the wind increases from, say 17 to 18 M. P. H. to about 20 M. P. H., the propeller blades are forced to a rearwardly inclined position causing a reduction in the diameter of the propeller decreasing its power rate, but which proportionately increases its speed to about 1,000 R. P. M. of said propeller, or to a wind speed of 20 M. P. H., the loss of the motorizing power of the propeller being thus balanced to maintain the same amount of power sufficient to drive the generator so that it develops its full charging rate at the moment the speed and power developed by the propeller enters into a balancing state.

In the event that the wind reaches such a high speed as would be likely to cause the windmill to overrun, causing damage to the windmill or to the generator, the further increased pressure of the wind on the blades, supplemented by the centrifugal action of the counterweights, will fold or force the blades rearwardly to a still greater angle, changing the conoidal angle to such an obliqual degree that the wind partly slides longitudinally and laterally and in devious other directions off the obliquely surfaced blades, utilizing the pitch of the propeller to apply compensating power sufficient to maintain proportional power and speed of the propeller required to keep it delivering the exact force necessary to drive the generator at its full charging rate. Any increased speed of the wind (pressure) causes the blades to fold rearwardly to still greater angles with an increasing loss in efficiency, and any decrease of the wind speed (pressure) will cause the blades to swing forwardly toward the flat running position, increasing the power efficiency of the propeller, in order to maintain a constant power and speed and to assure a safe running of the windmill at a speed of about, say, 20 M. P. H. of wind, even in the presence of the highest wind velocities driving the propeller, whose folding, feathering or reefing action at wind speeds beyond such safe running wind speeds reduces the effective force of the wind on the propeller, so as to maintain a calibrated and constant speed and power force to prevent damage to the windmill.

With this understanding the operation of the windmill is as follows, assuming the parts to be in the position shown in Fig. 1.

In the operation of controller 18, sleeve 27 is held in the position shown in Fig. 2 through the connection including cables 32, 32a, and connector 54 hung on holder 59, and springs 28 and 29 are held in a compressed and balanced state. Under the backward folding movements of blades 19 to different degrees sleeve 24 is forced inward to different degrees to slide sleeve 27 toward sleeve 26. These movements of the sleeve 27 may compress the springs to a greater degree but the springs remain in a balanced state until on a final range of inward movement of sleeve 24 under the action of weight 57 sleeve 27 comes close to sleeve 26, relaxing spring 28 and placing spring 29 under certain stronger compression. Parts 30', 30, 32, 51, 52 and 53 may float in the movements of sleeve 27 but sleeve 24 will be held in its secured controlling position as long as connector 54 remains hung on holder 59. When, however, the connector 54 is released from the holder 59, the weight 57 is freed and moves sleeve 27 over its range toward sleeve 26, thus allowing spring 28 to expand whereby it is weakened, allowing the propeller to fold or shift from fast charging to slower charging position.

The propeller when governed in speed by the action of mechanism 18 remains at its normal running position, with its blades facing at right angles to the wind during low and medium winds until a certain slightly higher than medium wind prevails, using the complete power efficiency of said low and medium wind velocities, but when the wind reaches a certain higher than medium velocity and pressure and it tends to drive the propeller at a slightly higher speed, the propeller will initiate a governing action on account of the action of the excess pressure of the wind against the blades 19 and the centrifugal action of counterweights 25'. This governing action of the propeller increases as the wind power increases, during which the blade angles change to maintain the propeller at the same governed R. P. M., regardless of high wind velocities. The propeller has two top governed speeds, first, one to maintain a high governed speed of the propeller when the wind reaches a certain speed as from 20 M. P. H. and up, and second, medium top governed speed R. P. M., as, for example, when the wind reaches 14 M. P. H., the R. P. M. of the propeller being then controlled to medium top speed and commence governing at said R. P. M. to maintain such speed no matter to what extent the speed of the wind increases.

In this system as disclosed, the windmill has to be set into rotating action by hanging the counterweight connector 54 on holder 59 which is also set by hand. The roller 55' of connector 54' may be set at the same time on holder 59'. The engagement of connector 54 with holder 59 sets the speed controller mechanism 18 so that the springs 29 and 28 expand fully against the sleeve 24. The propeller in this case will run freely at its maximum speed until the generator reaches its maximum charging rate, and the propeller is mechanically governed to maintain this rate until the wind reaches a speed that may be harmful to the windmill parts and generator windings. As the windmill propeller is developing its full power and speed and the generator driving a heavy charging rate through the battery, the charging rate must be controlled when the battery reaches a certain high state of charge in order to prevent overheating and damage to said battery. The charging must be lowered to a certain point so as to continue the process of charge in a safe way until the battery reaches a fully charged state. As the battery stores the charge, the voltage increases in proportion. The charging rate may then be lowered by releasing the roller 55 of connector 54 from holder 59, the weight 57, which drops, pulling cables 32a, 32, thereby operating lever 36 to slide sleeve 27 to the left, compressing the coil spring 29 and relaxing spring 28 so that it is weakened or its tension reduced to a certain point, depending on the heaviness of the counterweight 57, so that there is a calibrated but weakened pressure on the sleeve 24 against the folding action of the propeller blades 19 and the centrifugal action of the counterweights 25. The action of controlling the speed of the propeller in the manner above described adapts the propeller to drive the generator so it generates a certain lowered but effective charge rate, and sets the apparatus so that it begins to control the speed and keep it constant when the propeller reaches a certain medium speed controlled by the calibrated action of the weakened spring 28 depending on the amount of weight of the counterweight 57.

Fig. 3 illustrates in full and broken lines the normal starting and initial running position at $x$ and at $y$ and $z$ two of the many possible folding positions adapted to be assumed by the propeller blades under different and progressively increasing wind forces. When the blades are disposed in position $x$ their acting surfaces are fully exposed to the force of the wind to drive the generator at comparatively high speed under moderate wind forces. As the blades fold to positions $y$ and $z$, etc., under progressively increasing wind forces their working areas are reduced proportionately to the increases in wind speed. When the controller is set to balance the two springs the blades may fold under increasing wind pressures and unfold or move backwardly under relatively reduced wind pressures at any and all stages so that a certain substantially constant rate of speed of the propeller may be maintained at all wind speeds within nearly the full range of folding movements of the blades. Flexibility in the folding of the blades under wind pressures and unfolding movements of the blades under the action of controller 18 at relatively lower windspeeds is obtained, due to the construction of the propeller and controller, so that the windwheel will act easily, smoothly and with comparative silence at all speeds. When weight 57 is released from holder 59 and spring 28 is allowed to have full and free expansion the blades may fold to still greater degrees, under high wind forces, to drive the shaft at slow speed, kept substantially constant by the governing action of the governor 18. Owing to the fact that the controller 18 acts uniformly on all the blades all the blades will be equally adjusted by the wind forces and the controller, preventing irregularities in the action of the blade and undue wear and tear on the mill and ensuring a smooth running action of the mill at all times.

From the foregoing description, taken in connection with the drawings, the construction, mode of operation and advantages of my invention will be readily understood and appreciated by those versed in the art without a further and extended description. It is to be understood, of course that while the constructions disclosed herein are preferred, changes in the form, construction and arrangement of the parts, within the scope of the appended claims, may be made, and equivalents employed, without departing from the spirit or sacrificing any of the advantages of the invention.

What I claim is:

1. A winddriven propeller including in combination a casing, a shaft journaled therein, a hub fixed to the shaft, a plurality of propeller blades pivotally mounted on the hub for folding movements conoidally from a radial position toward and to different angular degrees with relation to the shaft under progressively increasing wind forces, an outer sleeve slidably mounted on the shaft, pivotal motion transmitting connections between the outer sleeve and the inner ends of the blades adapting said sleeve to be moved in one direction from a normal position under thrust of the blades when folding under increasing wind forces and adapting said sleeve to be moved back to normal position to transmit unfolding movements to the blades as the wind forces are relatively reduced, an inner sleeve fixed to the shaft, an intermediate sleeve slidably mounted on the shaft, springs mounted respectively between the outer sleeve and the intermediate sleeve and between the intermediate sleeve and the inner sleeve and acting on the two first-named sleeves to provide a yielding resistance to the folding movements of the blades, and means for adjusting the intermediate sleeve to vary the resistance of one of the springs relative to the other spring.

2. A winddriven propeller including in combination a casing, a shaft journaled therein, a hub fixed to the shaft, a plurality of propeller blades pivotally mounted on the hub for folding movements conoidally from a radial position toward and to different angular degrees with relation to the shaft under progressively increasing wind forces, an outer sleeve slidably mounted on the shaft, pivotal motion transmitting connections between the sleeve and the inner ends of the blades adapting the sleeve to be moved in one direction from a normal position under thrust of the blades when folding under increasing wind forces and adapting said sleeve to be moved back to normal position to transmit unfolding movements to the blades as the wind forces are relatively reduced, an inner sleeve fixed to the shaft, an intermediate sleeve slidably mounted on the shaft, outer and inner springs mounted respectively between the outer sleeve and the intermediate sleeve and between the intermediate sleeve and the inner sleeve and acting on the two first-named sleeves to provide a yielding resistance to the folding movements of the blades, a device supported by and within the casing and operative to slidably adjust said intermediate sleeve to reduce the resistance of the outer spring relative to the inner spring, and means for securing said device against movement to hold the intermediate sleeve in such adjusted position and against sliding movement.

3. A winddriven propeller including in combination a shaft, a hub fixed to the shaft, a plurality of propeller blades pivotally mounted on the hub for folding movements conoidally from a radial position toward and to different angular degrees with relation to the shaft under progressively increasing wind forces, an outer sleeve slidably mounted on the shaft, pivotal motion transmitting connections between the outer sleeve and the inner ends of the blades adapting the sleeve to be moved in one direction from a normal position under thrust of the blades when folding under increasing wind forces and adapting said sleeve to be moved back to normal position to transmit unfolding movements to the blades as the wind forces are relatively reduced, an inner sleeve rotatable with the shaft, an intermediate sleeve slidable on and rotatable with the shaft, compression and expansion springs arranged respectively between the outer and intermediate sleeves and between the intermediate and inner sleeves to provide a yielding resistance to the folding movements of the blades and to allow the outer and intermediate sleeves to shift to permit the blades to fold or cause them to unfold under wind forces of progressingly increasing and relatively reduced intensities, and means for controlling the movements of the intermediate sleeve to adapt the springs to be balanced or to adapt the outer spring to be weakened with respect to the inner spring.

4. A winddriven propeller including in combination a shaft, a hub fixed to the shaft, a plurality of propeller blades pivotally mounted on the hub for folding movements conoidally from a radial position toward and to different angular degrees with relation to the shaft under progressively increasing wind forces, an outer sleeve slidably mounted on the shaft, pivotal motion transmitting connections between the outer sleeve and the inner ends of the blades adapting the sleeve to be moved in one direction from a normal position under thrust of the blades when folding under increasing wind forces and adapting said sleeve to be moved back to normal position to transmit unfolding movements to the blades as the wind forces are relatively reduced, centrifugal counterweights connected to the inner ends of the blades and extending at an angle to their axes to neutralize the centrifugal resistance of the blades to folding movements, an inner sleeve rotatable with the shaft, an intermediate sleeve slidable on the shaft, compression and expansion springs arranged respectively between the outer and intermediate sleeves and between the intermediate and inner sleeves to provide a yielding resistance to the folding movements of the blades and to allow the outer and intermediate sleeves to shift to permit the blades to fold or cause them to unfold under wind forces of progressively increasing and relatively reduced intensities, and means for controlling the movements of the intermediate sleeve to adapt the springs to be balanced or to adapt the outer spring to be weakened with respect to the inner spring.

5. A winddriven propeller including in combination a shaft, a hub fixed to the shaft, a plurality of propeller blades pivotally mounted on the hub for folding movements conoidally from a radial position toward and to different angular degrees with relation to the shaft under progressively increasing wind forces, an outer sleeve slidably mounted on the shaft, pivotal motion transmitting connections between the outer sleeve and the inner ends of the blades adapting the sleeve to be moved in one direction from a normal position under thrust of the blades when folding under increasing wind forces and adapting said sleeve to be moved back to normal position to transmit unfolding movements to the blades as the wind forces are relatively reduced, an inner sleeve rotatable with the shaft, an intermediate sleeve slidable on the shaft, compression and expansion springs arranged respectively between the outer and intermediate sleeves and between the intermediate and inner sleeves to provide a yielding resistance to the folding movements of the blades and to allow the outer and intermediate sleeves to shift to permit the blades to fold or cause them to unfold under wind forces of progressively increasing and relatively reduced intensities, and a device for setting the intermediate sleeve in a position tending to keep the springs balanced and to maintain the blades in radial position while permitting them to fold under wind forces against a predetermined yielding resistance, said device being operable to adjust the intermediate sleeve to relatively bias the springs so as to reduce their resistance to the folding of the blades under wind forces.

6. A winddriven propeller including in combination a casing normally open at its rear end, a shaft extending longitudinally in the casing, a hub detachably secured to the shaft to rotate therewith and closing the rear end of the casing, a plurality of propeller blades pivotally mounted on the hub for folding movements conoidally from a radial position toward and to different angular degrees with relation to the shaft under progressively increasing wind forces, an outer sleeve slidably mounted on the shaft and normally abutting at its rear end against the hub, pivotal motion transmitting connections between the outer sleeve and the inner ends of the blades adapting the sleeve to be moved forwardly on the shaft from its normal position under thrust of the blades when folding under increasing wind forces and adapting said sleeve to be moved back to normal position from such forward position to transmit unfolding movements to the blades as the wind forces are relatively reduced, an inner sleeve fixed to rotate with the shaft and mounted thereon forwardly of the outer sleeve, an intermediate sleeve slidably mounted on the shaft between the outer and inner sleeves, compression and expansion springs arranged respectively between the outer and intermediate sleeves and between the intermediate and inner sleeves to provide a yielding resistance to the folding movements of blades and to allow the outer and intermediate sleeves to shift to permit the blades to fold or cause them to unfold under wind forces of progressingly increasing and relatively reduced intensities, a support carried by the casing, a device pivoted to the support and coupled to the intermediate sleeve so as to be adjustable to control the movements of the intermediate sleeve to adapt the springs to be balanced in action or to bias the springs so as to weaken one spring with respect to the other spring, and means for holding said device in spring biasing position or releasing the same to restore the balancing action of the springs.

7. A winddriven propeller including in combination a horizontally disposed casing having a normally open rear end, a shaft extending longitudinally within the casing and projecting at its rear end outwardly beyond the rear end thereof, a concavo-convex hub fixed to the rear end of the shaft and closing the rear end of the casing with its concaved side facing said end of the casing, said concaved side of the hub having a central abutment surface, a controlling sleeve disposed within the concavity of the hub and normally bearing at one end against said abutment surface, said sleeve being slidable on the shaft forwardly away from and backwardly toward said abutment surface, a plurality of propeller blades, bracket members fixed to the inner ends of the blades and pivotally connected to the hub and mounting the blades on the hub for folding movements conoidally from a normal radial position relative to the shaft toward and to different angular degrees relative to the shaft under progressively increasing wind forces, said bracket members having crank arms extending beyond their pivotal connections with the hub toward the shaft into the concavity of the hub, links connecting the crank arms with the sleeve to slide the sleeve forwardly on the shaft on the folding movements of the blades, an abutment in the casing and disposed about the shaft in spaced relation to and forwardly of the sleeve, and a spring about the shaft between the sleeve and abutment and providing a yielding resistance to the sliding movement of the sleeve forwardly from its normal position when the blades fold under progressively increasing wind forces and operative to move the sleeve and blades backward toward their normal positions as the wind forces are relatively reduced.

8. A winddriven propeller including in combination a horizontally disposed casing having a normally open rear end, a shaft extending longitudinally within the casing and projecting at its rear end outwardly beyond the rear end thereof, a concavo-convex hub fixed to the rear end of the shaft and closing the rear end of the casing with its concaved side facing the said end of the casing, said concaved side of the hub having a central abutment surface, a controlling sleeve disposed within the concavity of the hub and normally bearing at one end against said abutment surface, said sleeve being slidable on the shaft forwardly away from and backwardly toward said abutment surface, a plurality of propeller blades, bracket members fixed to the inner ends of the blades and pivotally connected to the hub and mounting the blades on the hub for folding movements conoidally from a normal radial position relative to the shaft toward and to different angular degrees relative to the shaft under progressively increasing wind forces, said bracket members having crank arms extending beyond their pivotal connections with the hub toward the shaft into the concavity of the hub, links connecting the crank arms with the sleeve to slide the sleeve forwardly on the shaft on the folding movements of the blades, an abutment in the casing and disposed about the shaft in spaced relation to and forwardly of the sleeve, a spring about the shaft between the controlling sleeve and abutment and providing a yielding resistance to the sliding movement of the controlling sleeve forwardly from its normal position when the blades fold under progressively increasing wind forces and operative to move the sleeve and blades backward toward their normal positions as the wind forces are relatively reduced, and centrifugal counterweights of arcuately curved form arranged at right angles to the blades normally about the casing concentric with the shaft and fixed to the inner ends of the blades and acting on the blades to neutralize the centrifugal resistance of the blades to folding movement.

9. A winddriven propeller including in combination a horizontally disposed casing having a normally open rear end, a shaft extending longitudinally within the casing and projecting at its rear end outwardly beyond the rear end thereof, a concavo-convex hub fixed to the rear end of the shaft and closing the rear end of the casing with its concaved side facing the said end of the casing, said concaved side of the casing having a central abutment surface, a controlling sleeve disposed within the concavity of the hub and normally bearing at one end against said abutment surface, said sleeve being slidable on the shaft forwardly away from and backwardly toward said abutment surface, a plurality of propeller blades, bracket members fixed to the inner ends of the blades and pivotally connected to the hub and mounting the blades on the hub for folding movements conoidally from a normal radial position relative to the shaft toward and to different angular degrees relative to the shaft under progressively increasing wind forces, said bracket members having crank arms extending beyond their pivotal connections with the hub toward the shaft into the concavity of the hub, links connecting the crank arms with the sleeve to slide the sleeve forwardly on the shaft on the folding movements of the blades, an abutment sleeve in the casing and slidably mounted on the shaft in spaced relation to and forwardly of the controlling sleeve, a spring about the shaft between the controlling sleeve and abutment sleeve providing a yielding resistance to the sliding movement of the controlling sleeve forwardly from its normal position when the blades fold under progressively increasing wind forces and operative to move said controlling sleeve and the blades backward toward their normal positions as the wind forces are relatively reduced, and means for adjusting the abutment sleeve relative to the controlling sleeve to vary the yielding resistance of the spring and for fixing said abutment sleeve in adjusted position.

10. A winddriven propeller including in combination a horizontally disposed casing having a normally open rear end, a shaft extending longitudinally within the casing and projecting at its rear end outwardly beyond the rear end thereof, a concavo-convex hub fixed to the rear end of the shaft and closing the rear end of the casing with its concaved side facing the said end of the casing, said concaved side of the hub having a central abutment surface, a controlling sleeve disposed within the concavity of the hub and normally bearing at one end against said abutment surface, said sleeve being slidable on the shaft forwardly away from and backwardly toward said abutment surface, a plurality of propeller blades, bracket members fixed to the inner ends of the blades and pivotally connected to the hub and mounting the blades on the hub for folding movements conoidally from a normal radial position relative to the shaft toward and to different angular degrees relative to the shaft under progressively increasing wind forces, said bracket members having crank arms extending beyond their pivotal connections with the hub toward the shaft into the concavity of the hub, links connecting the crank arms with the sleeve to slide the sleeve forwardly on the shaft on the folding movements of the blades, an abutment sleeve slidably mounted on the shaft in spaced relation to and located forwardly of the controlling sleeve, an outer spring about the shaft between the controlling sleeve and abutment sleeve and providing a yielding resistance to the sliding movement of the sleeve forwardly from its normal position when the blades fold under progressively increasing wind forces and operative to move said controlling sleeve and blades backward toward their normal positions as the wind forces are relatively reduced, a support in the casing, an inner spring disposed between said support and the abutment sleeve and acting thereon in opposition to the first-named spring, a lever pivoted to the support and abutment sleeve whereby said sleeve may be adjusted to balance the springs or to weaken the outer spring with respect to the inner spring, and means for actuating the lever and holding the same and the abutment sleeve in adjusted positions.

11. A winddriven propeller including in combination a rotatable shaft, a hub fixed to the shaft, a blade adjusting sleeve rotatable with and slidable on the shaft, a plurality of propeller blades, bracket members fixed to the inner ends of the blades and having arms pivotally connected to the hub and mounting the blades thereon for folding movements conoidally from a radial position relative to the shaft toward and to different angular degrees relative to the shaft under progressively increasing wind forces, said arms of the bracket members having extensions rigid therewith and projecting inwardly from the points of pivotal connection of the arms with the hub toward the shaft, links connecting said extensions of the arms with the blade adjusting sleeve to cause said sleeve to slide in one direction on the folding movements of the blades, an abutment sleeve slidably mounted on the shaft, a spring arranged between the sleeves and acting on said blade adjusting sleeve to provide a yielding resistance to such sliding movement of the blade adjusting sleeve and folding movements of the blades under increasing wind forces and for sliding the blade adjusting sleeve in the opposite direction to move the blades backward toward their normal radial position when the wind forces are relatively reduced, a movably mounted controlling member connected to the abutment sleeve and operable for adjusting said abutment sleeve to vary the resistance of the spring to the sliding movement of the blade adjusting sleeve, and means for operating said member.

12. A winddriven propeller including in combination a casing, a rotatable shaft arranged therein, a hub fixed to the shaft, a controlling sleeve rotatable with and slidable axially on the shaft, a plurality of propeller blades, bracket members fixed to the inner ends of the blades and having arms pivotally connected to the hub and mounting the blades thereon for folding movements conoidally from a radial position relative to the shaft toward and to different angular degrees relative to the shaft under progressively increasing wind forces, said bracket arms having extensions rigid therewith and projecting inwardly from the points of pivotal connection of the arms with the hub toward the shaft, links connecting said extensions of the arms with the controlling sleeve to cause said sleeve to slide in one direction on the folding movements of the blades, a spring bearing at one end on said controlling sleeve to provide a yielding resistance to such sliding movement of the sleeve and folding movements of the blades under increasing wind forces and operative to slide the controlling sleeve in the opposite direction when the wind forces are relatively reduced, an abutment sleeve adjustable on the shaft toward and from the controlling sleeve and bearing against the other end of the spring, a supporting member fixed to the casing, a yoke pivotally supported by said member and pivotally engaging the abutment sleeve, and means connected to the yoke for operating the yoke to adjust the abutment sleeve to vary the resistance of the springs and for holding the yoke stationary to maintain the abutment sleeve in adjusted position.

13. A winddriven propeller including in combination a rotatable shaft, a hub fixed to the shaft, a blade adjusting sleeve rotatable with and slidable axially on the shaft, a plurality of propeller blades, bracket members fixed to the inner ends of the blades and having arms pivotally connected to the hub and mounting the blades thereon for folding movements conoidally from a radial position relative to the shaft toward and to different angular degrees relative to the shaft under progressively increasing wind forces, said arms having extensions rigid therewith and projecting inwardly from the points of pivotal connection of the arms with the hub toward the shaft, links connecting said extensions of the arms with the blade adjusting sleeve to cause said sleeve to slide in one direction on the folding movements of the blades, a spring bearing at one end on said blade adjusting sleeve to provide a yielding resistance to such sliding movement of the sleeve and folding movements of the blades under increasing wind forces and operative to slide the controlling sleeve in the opposite direction when the wind forces are relatively reduced, a controlling sleeve adjustable on the shaft toward and from the blade adjusting sleeve and forming an abutment for the other end of the spring, a pivotally mounted operating member connected to the abutment sleeve for holding the abutment sleeve in a predetermined normal position and for adjusting it to vary the resistance of the spring to the sliding movement of the blade adjusting sleeve in the first-named direction, and means for operating said member.

CHARLES FUMAGALLI.

REFERENCES CITED

The following references are of record in the file of this patent:

UNITED STATES PATENTS

| Number | Name | Date |
| --- | --- | --- |
| 191,168 | Nesbitt | May 22, 1877 |
| 212,236 | Kuempel | Feb. 11, 1879 |
| 607,774 | Soellner | July 19, 1898 |
| 890,893 | Eggleston | June 16, 1908 |
| 1,093,881 | Payton | Apr. 21, 1914 |
| 1,114,759 | Heyroth | Oct. 27, 1914 |
| 1,125,783 | Waters | Jan. 19, 1915 |
| 1,165,418 | Kerr | Dec. 28, 1915 |
| 1,178,729 | Kemble | Apr. 11, 1916 |
| 1,362,753 | Sperry | Dec. 21, 1920 |
| 1,857,036 | Wisk | May 3, 1932 |

FOREIGN PATENTS

| Number | Country | Date |
| --- | --- | --- |
| 342,777 | Germany | Oct. 24, 1921 |
| 647,287 | Germany | July 1, 1937 |
| 868,278 | France | Sept. 22, 1941 |